US011861048B2

(12) United States Patent
Zadok et al.

(10) Patent No.: US 11,861,048 B2
(45) Date of Patent: Jan. 2, 2024

(54) OPERATION MODE SELECTION AND SYNCHRONIZATION FOR CONVERGED DEVICES (71) Applicant: MOTOROLA SOLUTIONS, INC., Chicago, IL (US)

(72) Inventors: Danny Zadok, Reshon Letzion (IL); David Bar-On, Rehovot (IL); Yosef Ben Ari, Hadera (IL); Yakir Nahum, Tiberias (IL); Oren Peled, Ramat-Gan (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 90 days.

(21) Appl. No.: 17/657,539

(22) Filed: Mar. 31, 2022

(65) Prior Publication Data

US 2023/0315915 A1    Oct. 5, 2023

(51) Int. Cl.
*G06F 9/00*    (2006.01)
*G06F 15/177*  (2006.01)
(Continued)

(52) U.S. Cl.
CPC ............ *G06F 21/74* (2013.01); *G06F 9/4401* (2013.01); *G06F 9/54* (2013.01); *H04W 8/183* (2013.01)

(58) Field of Classification Search
CPC ........... G06F 21/74; G06F 9/4401; G06F 9/54
See application file for complete search history.

(56) References Cited

U.S. PATENT DOCUMENTS 7,899,078 B1    3/2011  Lai et al.
8,874,097 B1    10/2014 Warsaw et al.
(Continued)

FOREIGN PATENT DOCUMENTS

CN    110781528 A    2/2020
CN    113364912 A    9/2021
(Continued)

OTHER PUBLICATIONS

International Search Report and Written Opinion for Application No. PCT/US2023/063883 dated Jun. 1, 2023 (14 pages).

*Primary Examiner* — Mohammed H Rehman
(74) *Attorney, Agent, or Firm* — Michael Best & Friedrich LLP (57) ABSTRACT

A converged device including a first subsystem and a second subsystem, configured to operate in multiple operation modes with varying levels of security. One example provides a method for operating the device. The method includes determining, during a startup sequence of the first subsystem and with a first processor of the first subsystem, a last operation mode for the first subsystem. The method includes determining, responsive to detecting that a SIM is installed in the converged device, a network type for the SIM. The method includes controlling, with the first processor, a first communication interface based on the network type and the last operation mode. The method includes determining, during a startup sequence of the second subsystem and with a second processor of the second subsystem, the last operation mode for the first subsystem and controlling, with the second processor, a second communication interface based on the last operation mode.

23 Claims, 4 Drawing Sheets

(51) Int. Cl.
  *G06F 21/74* (2013.01)
  *G06F 9/54* (2006.01)
  *G06F 9/4401* (2018.01)
  *H04W 8/18* (2009.01)

(56) References Cited

U.S. PATENT DOCUMENTS

| | | |
|---|---|---|
| 8,989,207 B2 | 3/2015 | Sajadieh et al. |
| 9,510,355 B2 | 11/2016 | Meredith et al. |
| 9,514,300 B2 | 12/2016 | Uner et al. |
| 9,646,152 B2 | 5/2017 | Lam et al. |
| 9,826,081 B2 | 11/2017 | Huslak |
| 10,015,658 B1* | 7/2018 | Alfaro ............... H04M 1/72418 |
| 10,901,479 B1 | 1/2021 | Boerger et al. |
| 2007/0254713 A1 | 11/2007 | Lagnado et al. |
| 2012/0309344 A1 | 12/2012 | Ferrazzini et al. |
| 2014/0086154 A1 | 3/2014 | Sajadieh |
| 2015/0119108 A1* | 4/2015 | Philbin ............. H04W 52/0267 455/566 |
| 2016/0277387 A1 | 9/2016 | Deweese et al. |
| 2016/0316357 A1* | 10/2016 | Liu ....................... H04W 8/205 |
| 2021/0327989 A1* | 10/2021 | Qiu ........................ H01L 25/18 |
| 2022/0150788 A1* | 5/2022 | Jiang ................. H04W 36/0085 |
| 2022/0174497 A1* | 6/2022 | Guo ..................... H04W 12/72 |
| 2022/0386119 A1* | 12/2022 | Shen ..................... H04W 8/205 |
| 2023/0261681 A1* | 8/2023 | Lee ..................... H04B 1/1615 455/552.1 |

FOREIGN PATENT DOCUMENTS

| | | |
|---|---|---|
| CN | 113691998 A | 11/2021 |
| DE | 102012102217 B4 | 2/2016 |
| EP | 0973347 A1 | 1/2000 |

\* cited by examiner

OPERATION MODE SELECTION AND SYNCHRONIZATION FOR CONVERGED DEVICES

BACKGROUND OF THE INVENTION

Wireless communication devices transfer information using various communication modalities. To satisfy the needs of a particular communication system or user, some wireless communication devices include features that support communications via multiple communication modalities. Devices with such features are sometimes referred to as converged devices. Communication modalities that some converged devices are compatible with include, for example, Long-Term Evolution (LTE) and other cellular communications protocols and Land Mobile Radio (LMR) protocols. Some converged devices are configurable to access multiple distinct wireless networks, for example, both LTE and LMR networks, including networks that are either public or private.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate examples, instances, and/or aspects of concepts that include the claimed subject matter, and explain various principles and advantages of examples, instances, and/or aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples.

The apparatus and method components have been represented where appropriate by conventional symbols in the drawings, showing only those specific details that are pertinent to understanding the examples, instances, and aspects illustrated so as not to obscure the disclosure with details that will be readily apparent to those of ordinary skill in the art having the benefit of the description herein.

DETAILED DESCRIPTION OF THE INVENTION

A converged wireless communication device (for example, a converged communication device) is a device capable of communicating within multiple communication systems implementing different communication modalities. For example, a converged device may communicate simultaneously in both a Land Mobile Radio (LMR) communication system and a cellular communication system. Some converged devices incorporate multiple subsystems of different types, for example, a cellular subsystem and an LMR subsystem. In some devices, the LMR subsystem can be connected to an entity's private, secure LMR network, while the cellular subsystem may connect to the entity's private cellular system or a public cellular system, which has access to, among other things, the public Internet.

To mitigate information leakage risks, some converged communication devices are configured to operate in independent secure and non-secure operation modes. Different data partitions, using different encryption keys or methods, are used with each mode. Access to public networks is restricted while operating in the secure operation mode. The operation mode is selected upon device powerup, and only secure or non-secure modules are loaded and activated, depending on the operation mode selected.

For certain types of users (for example, public safety personnel), land-mobile communications are a critical aspect of their use of the communication device. Accordingly, an LMR subsystem boots in a relatively short period of time (for example, three to seven seconds). However, a cellular subsystem may take a relatively long time to boot up (for example, thirty seconds or longer). As a consequence, it may be possible for the LMR subsystem to be capable of secure or privileged communications with a private LMR network before it has been established whether the cellular subsystem will operate in a secure or non-secure operation mode. Accordingly, examples described herein provide, among other things, a converged communication device, which allows for the manual or automatic selection of an operation mode for a cellular subsystem while providing operation mode synchronization with an LMR subsystem.

Using examples provided herein, a converged communication device is capable of automatically enabling and disabling communication modalities based on the last operation mode for the device. In one example, the LMR subsystem will powerup and operate to communicate based on the last operation mode, and, if necessary, alter its operation based on a mode notification from the cellular subsystem. Using such examples, users are able to access both cellular and LMR communications, while maintaining desired security levels.

One example provides a converged communication device including a first subsystem and a second subsystem. The first subsystem includes a first electronic processor and a first communication interface configured to communicate wirelessly using a first communication modality. The second subsystem includes a second electronic processor and a second communication interface configured to communicate wirelessly using a second communication modality. The first electronic processor is coupled to the first communication interface and configured, during a startup sequence of the first subsystem, to determine a last operation mode for the first subsystem. The first electronic processor is configured to detect whether a subscriber identity module is installed in the converged communication device. The first electronic processor is configured to, responsive to detecting that a subscriber identity module is installed in the converged communication device, determine a network type for the subscriber identity module. The first electronic processor is configured to control the first communication interface based on the network type and the last operation mode. The first electronic processor is configured to, responsive to detecting that a subscriber identity module is not installed in the converged communication device, control the first communication interface to not communicate wirelessly. The second electronic processor is coupled to the second communication interface and configured, during the startup sequence of the second subsystem, to determine the last operation mode for the first subsystem. The second electronic processor is configured to control the second communication interface based on the last operation mode.

Another example provides a method for operating a converged communication device including a first subsystem and a second subsystem. The method includes determining, during a startup sequence of the first subsystem and with a first electronic processor of the first subsystem, a last operation mode for the first subsystem. The method includes detecting whether a subscriber identity module is installed in the converged communication device. The method includes determining, responsive to detecting that a subscriber identity module is installed in the converged communication device, a network type for the subscriber identity module. The method includes controlling, with the first electronic processor, a first communication interface based on the network type and the last operation mode. The method includes determining, during a startup sequence of the second subsystem and with a second electronic processor of the second subsystem, the last operation mode for the first subsystem. The method includes controlling, with the second electronic processor, a second communication interface based on the last operation mode.

For ease of description, each of the example systems presented herein may be illustrated with a single exemplar of each of its component parts. Some examples may not describe or illustrate all components of the systems. Actual applications of the example systems described herein may include more or fewer of each of the illustrated components, may combine some components, or may include additional or alternative components.

Figure 1:
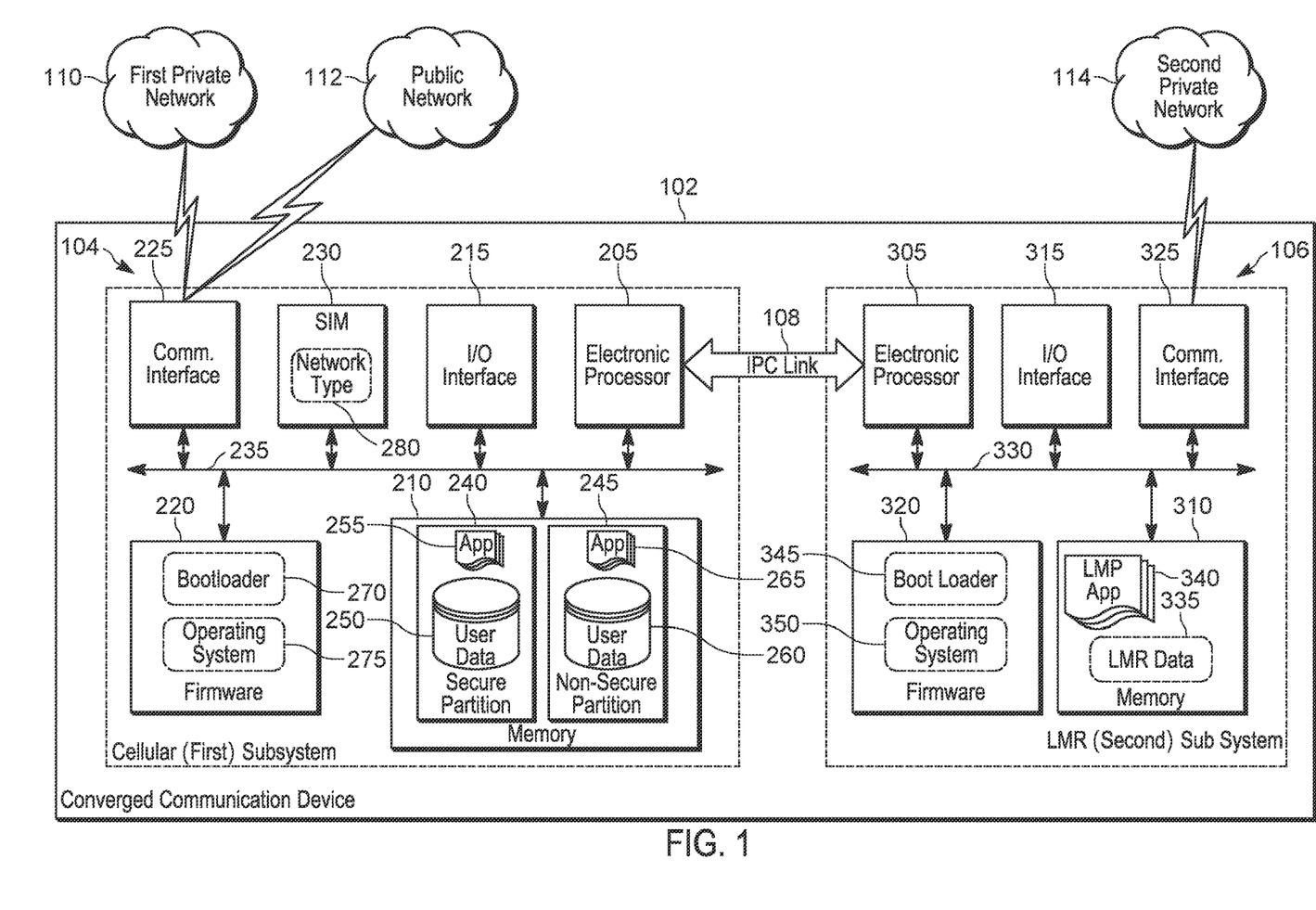
FIG. 1 is a block diagram of a converged communication device, according to one example.

FIG. 1 illustrates a converged communication device 102 according to one example. In the example illustrated, the converged communication device 102 includes two subsystems, a cellular subsystem 104 and a land mobile radio (LMR) subsystem 106. In the example shown, the cellular subsystem 104 and the land mobile radio (LMR) subsystem 106 are communicatively coupled to one another via an inter processor link (IPC) 108. As described herein, the cellular subsystem 104 is configured to connect to and wirelessly communicate using a first private network 110 or a public network 112, based on an operation mode for the cellular subsystem 104, while the LMR subsystem 106 is configured to connect to and wirelessly communicate using a second private network 114 based on the operation mode for the cellular subsystem 104. FIG. 1 illustrates a single converged communication device 102 configured to communicate wirelessly using the illustrated example networks. This is provided as a non-limiting example. In other instances, the converged communication device 102 may communicate using multiple different private and public networks. Although FIG. 1 illustrates a single converged communication device 102, the methods described herein are applicable to instances where multiple networks of differing types operate to provide communications for tens, hundreds, or thousands of converged communication devices.

The first private network 110 is an example communication network, which includes wireless connections, wired connections, or combinations of both, operating according to an industry standard cellular protocol, for example, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which, among other things, an open mobile alliance (OMA) push to talk (PTT) over cellular (OMA-PoC), a voice over IP (VoIP), or a PTT over IP (PoIP) application may be implemented. The first private network 110 is, for example, a corporate or government network, which provides access only to authorized users of particular organizations or agencies. Consumer cellular devices are not allowed to authenticate to, roam on, or otherwise access the first private network 110.

The public network 112 is an example communication network operating according to cellular protocols, as described above with respect to the private network 110. The public network 112 is provided by a carrier, which sells access to ordinary consumers (for example, private citizens). Consumer cellular devices from other public networks may be able to roam on or otherwise access the public network 112.

The second private network 114 is a land mobile radio network, which includes wireless connections, wired connections, or combinations of both, operating according to the Project 25 (P25) standard defined by the Association of Public Safety Communications Officials International (APCO), the Terrestrial Trunked Radio (TETRA) standard defined by the European Telecommunication Standards Institute (ETSI), the Digital Private Mobile Radio (dPMR) standard also defined by the ETSI, among other possibilities, and over which multimedia broadcast multicast services (MBMS), single site point-to-multipoint (SC-PTM) services, or Mission Critical Push-to-talk (MCPTT) services may be provided. The second private network 114 may operate using talkgroups, which are virtual radio channels used to provide communication for groups of converged communication devices and other types of LMR subscriber units. The second private network 114 is, for example, a corporate or government network, which provides access only to authorized users of particular organizations or agencies. In some instances, the first private network 110 and the second private network 114 are operated by or for the same entity, for example, a law enforcement agency.

The converged communication device 102 may include other components, for example, one or more antennas, a land-mobile radio modem, a baseband modem, a microphone, a speaker, and other processors and chipsets (not shown).

In the illustrated example, the cellular subsystem 104 includes an electronic processor 205, a memory 210, an input/output interface 215, a firmware 220, a communication interface 225, and a subscriber identity module 230. The illustrated components, along with other various modules and components are coupled to each other by or through one or more control and/or data buses that enable communication therebetween (for example, a communication bus 235).

The electronic processor 205 obtains and provides information (for example, from the memory 210, the input/output interface 215, the firmware 220, and combinations thereof), and processes the information by executing one or more software instructions or modules, capable of being stored, for example, in a random access memory ("RAM") area of the memory 210 or a read only memory ("ROM") of the memory 210, the firmware 220, or another non-transitory computer readable medium (not shown). The software can include firmware, one or more applications, program data, filters, rules, one or more program modules, and other executable instructions. The electronic processor 205 is configured to retrieve, from the memory 210 and the firmware 220, and execute, among other things, software related to the control processes and methods described herein.

The memory 210 can include one or more non-transitory computer-readable media and includes a program storage area and a data storage area. The program storage area and the data storage area can include combinations of different types of memory, as described herein. In the example illustrated, the memory 210 stores, among other things, a secure partition 240 and a non-secure partition 245. As described herein, the electronic processor 205 boots the cellular subsystem 104 using either the secure partition 240 or the non-secure partition 245 based on an operation mode for the cellular subsystem 104.

The secure partition 240 is used to store and allow to access data (for example, the user data 250) and applications (for example, the secure applications 255) securely on the converged communication device 102 or in a remote environment (for example, a cloud-based secure computing environment accessible via the first private network 110). The secure partition 240 is, for example, an authenticated, encrypted area of the memory 210, which can be used to insulate sensitive information from non-secure partition 245. The secure partition 240 allows a user of the converged communication device 102 to access the secured data, applications, or remote environments, but only allows authorized functions or applications on the converged communication device 102 to access data, applications or other functions inside the secure partition 240 or the remote environment. For example, the LMR subsystem 106 may be able to access or store data from the secure partition 240. Similarly, applications running on the secure partition 240 (for example, a computer aided dispatch client) may be able to operate the LMR subsystem 106 to communicate via the second private network 114.

The non-secure partition 245 is used to store and allow to access data (for example, the user data 260) and applications (for example, the applications 265) on the converged communication device 102 or in a remote environment (for example, a cloud-based computing environment accessible via the public network 112 or the Internet). In some instances, the non-secure partition 245 may be used to provide a user access to smart telephone functions and applications, for example, when the private network 110 or another private cellular network is unavailable. In other instances, the non-secure partition 245 may provide an official user with a non-official personal device persona to use while not operating in an official capacity, for example, rather than operating a bring your own device (BYOD) environment. Regardless of its purpose, the non-secure partition 245 is not allowed access to the private networks to which the secure partition 240 is allowed access. Similarly, the non-secure partition 245 is not allowed to access the functions of the LMR subsystem 106.

In this description, the terms "secure" and "non-secure" are used to distinguish, in a general way, between how data and applications in those partitions may be secured from unauthorized access, for example, through the use of different authentication mechanisms, encryption mechanisms, network security mechanisms, and the like. The terms, however, are not meant to imply that anything so labeled is superior or inferior. "Secure" partitions utilize mechanisms that provide a relatively higher security level relative to "non-secure" partitions. The converse is also true. Partitions labeled "non-secure" do not lack all security, but rather utilize mechanisms that provide a relatively lower security level relative to "secure" partitions.

The input/output interface 215 is configured to receive input and to provide system output. The input/output interface 215 obtains information and signals from, and provides information and signals to, (for example, over one or more wired and/or wireless connections) devices both internal and external to the converged communication device 102. The input/output interface 215 may include one or more human machine interfaces that enable a user to interact with and control the cellular subsystem 104 and other aspects of the converged communication device 102. For example, the input/output interface 215 may include a display (for example, a liquid crystal display (LCD) touch screen, an organic light-emitting diode (OLED) touch screen, and the like) and suitable physical or virtual selection mechanisms (for example, buttons, keys, knobs, switches, and the like). In some instances, the input/output interface 215 implements a graphical user interface (GUI) (for example, generated by the electronic processor 205, from instructions and data stored in the memory 210, and presented on a suitable display), that enables a user to interact with the converged communication device 102.

In one instance, the firmware 220 is a non-volatile, electrically-rewritable computer storage medium, which includes a bootloader 270 and an operating system 275. In some instances, all or part of the bootloader 270, the operating system 275, or both may be stored in a read only memory of the memory 210 or in another suitable electronic memory.

The communication interface 225 includes components operable to communicate wirelessly with the first private network 110, the public network 112, and other networks using a cellular communication modality, as described herein. The communication interface 225 may include, for example, one or more baseband processors, transceivers, antennas, as well as various other digital and analog components, which for brevity are not described herein and which may be implemented in hardware, software, or a combination of both. Some instances may include separate transmitting and receiving components, for example, a transmitter and a receiver, instead of or in addition to a combined transceiver.

The subscriber identity module (SIM) 230 includes various subscription profiles, access credentials, and configuration information (for example, the network type 280) used by the cellular subsystem 104 to authenticate to and communicate via the first private network 110, the public network 112, and other networks using a cellular communication modality. In some instances, the SIM 230 is removable from the converged communication device 102. In one example, the SIM 230 is a universal integrated circuit card (UICC).

In one example, the electronic processor 205 is configured to, upon powerup or reboot of the converged communication device 102, execute the bootloader 270. The bootloader 270 is configured to initiate start-up of the cellular subsystem 104 by retrieving the operating system 275 from the firmware 220 and placing it into memory 210. As described herein, the electronic processor 205 reads the operating system 275 from the memory 210 and boots the operating system 275 using either the secure partition 240 or the non-secure partition 245, based on a selected operation mode for the cellular subsystem 104. In some instances, the operating system 275 remains in, and is executed from, the firmware 220. In one example, the bootloader 270 operates to read and write data to and from the cellular subsystem 104 and the LMR subsystem 106 via the inter-processor communication link 108.

The operating system 275 is, for example, a Unix operating system variant such as Android™. Before the cellular subsystem 104 can be used (for example, but executing applications stored on one of the partitions), it must boot. The boot time for the operating system 275 (that is, the time between power up and when the operating system 275 is ready for operation) is, for certain operating systems, for example, thirty seconds or longer.

The LMR subsystem 106 includes an electronic processor 305, a memory 310, an input/output interface 315, a firmware 320, and a communication interface 325. The illustrated components, along with other various modules and components are coupled to each other by or through one or more control and/or data buses that enable communication therebetween (for example, a communication bus 330). The electronic processor 305, memory 310, input/output interface 315, and firmware 320 are similar and operate similarly to their respective counterparts in the cellular subsystem 104.

In one example, the input/output interface 315 includes a push-to-talk (PTT) button for activating components of the communication interface 325 to transmit voice or other communications (not shown). The PTT button may be implemented, for example, as a physical switch or by using a soft key or icon in the graphical user interface on a display of the input/output interface 315 or, as noted above, the input/output interface 215.

The communication interface 325 includes components operable to communicate wirelessly with the second private network 114 and other networks using a land mobile radio communication modality, as described herein (for example, using or according to the LMR data 335 and other LMR applications 340). The communication interface 325 may include, for example, one or more baseband processors, transceivers, antennas, as well as various other digital and analog components, which for brevity are not described herein and which may be implemented in hardware, software, or a combination of both. Some instances may include separate transmitting and receiving components, for example, a transmitter and a receiver, instead of or in addition to a combined transceiver.

In one example, the electronic processor 305 is configured to, upon powerup or reboot of the converged communication device 102, execute the bootloader 345. The bootloader 345 is configured to initiate start-up of the LMR subsystem 106 by retrieving the operating system 350 from the firmware 320 and placing it into memory 310. In one example, the operating system 350 contains or executes software for communicating over a land mobile radio network (for example, using the LMR data 335 and other LMR applications 340). In one example, the operating system 350 is a real-time operating system (RTOS). Similar to the cellular subsystem 104, before the LMR subsystem 106 can be used, it must boot. The boot time for the LMR operating system 350 may be much shorter than the boot time for cellular operating system 275. In some instances, for example, the boot time for the operating system 350 may be between three and seven seconds.

When the converged communication device 102 is powered up or rebooted, both the cellular subsystem 104 and the LMR subsystem 106 begin their startup routines (also referred to herein as startup sequences). Before either of the subsystems and its respective functions can be used, it must complete start-up. The startup routines for the subsystems include the booting of the processor and the loading of their respective operating systems. As noted above, the LMR subsystem 106 may boot up significantly faster than the cellular subsystem 104. In one example, the start-up for the LMR subsystem 106 completes well before the start-up for the cellular subsystem 104. As a consequence, it may be possible for the LMR subsystem 106 to be capable of secure or privileged communications with the second private network 114 before it has been established whether the cellular subsystem 104 will operate in a secure or non-secure operation mode.

Figure 2:
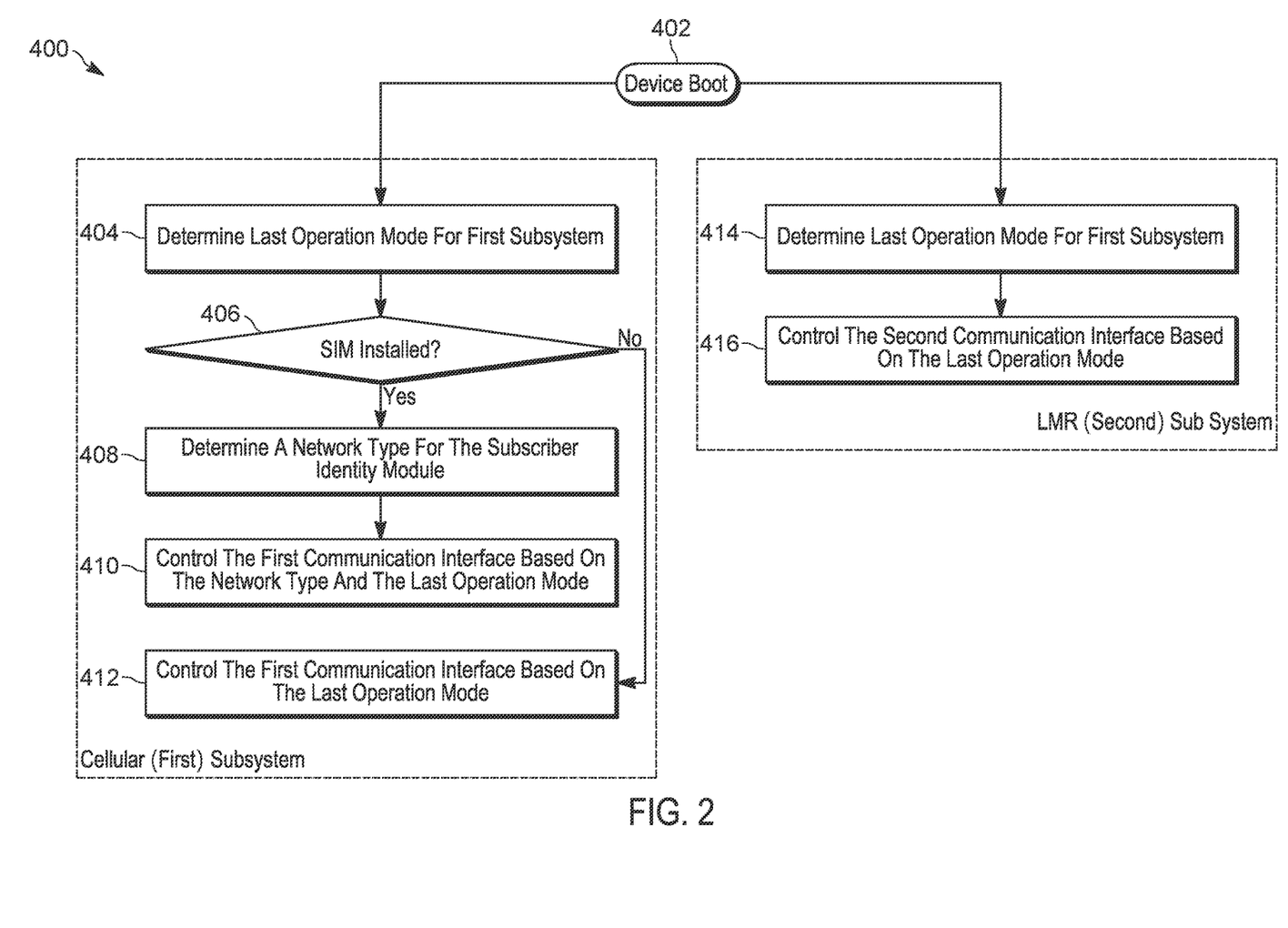
FIG. 2 is a block diagram of a method performed by the converged communication device of FIG. 1, according to some examples.

FIG. 2 illustrates one example method 400 for operating a converged communication device. The method 400 is described as being executed by the electronic processors 205 and 305 (also referred to herein as the first and second electronic processors). However, in some examples, aspects of the method 400 may be performed by other components of the converged communication device 102. For example, some or all of the method 400 may be performed by the electronic processors in conjunction with their respective bootloaders. As an example, the method 400 is described in terms of a first subsystem (the cellular subsystem 104) and a second subsystem (the LMR subsystem 106).

At block 402, the converged communication device 102 boots. The bootup may be the result of a powerup from powered off state or the result of a reboot initiated during a previous powered on state. As illustrated in FIG. 2, the first and second subsystems perform their respective powerup sequences as a result of the converged communication device 102 booting.

At block 404, the electronic processor 205 determines a last operation mode for the first subsystem (for example, the cellular subsystem 104). An operation mode of the first subsystem may be, for example, a secure mode and a non-secure mode. For example, when the first subsystem is operating in a secure mode, it has been booted using the secure partition 240, and when the first subsystem is operating in a non-secure mode, it has been booted using the non-secure partition 245. The last operation mode identifies the operation mode of the first subsystem immediately prior to the current powerup sequence. For example, if the cellular subsystem 104 is operating in a secure mode (that is, from the secure partition 240) and is powered down, the last operating mode when it powers up is the secure mode. Similarly, if the cellular subsystem 104 is operating in a non-secure mode (that is, from the non-secure partition 245) and is rebooted, the last operating mode when it begins booting up is the non-secure mode.

In one example, the electronic processor 205 determines the last operation mode by reading from a non-volatile memory of the cellular subsystem 104. For example, a sequence of bits identifying the current operation mode may be written to a boot sector of the memory 210 while the cellular subsystem 104 is operating. Upon a subsequent bootup, the current operation mode that was saved in the boot sector represents the last operation mode of the cellular subsystem 104.

In another example, the last operation mode is selected by the user of the converged communication device prior to device reboot and the electronic processor 205 determines the last operation mode by retrieving the user-selected operation mode from a memory of the converged communication device (for example, the memory 210). For example, as described herein, a power menu of the device may allow for a user to select the operation mode prior to a reboot. In such instances, the "last operation mode" may not refer to the last operation mode in which the device was operating, but rather the last operation mode selected by the user.

At block 406, the electronic processor 205 detects whether a subscriber identity module is installed in the converged communication device 102. For example, the electronic processor 205 may put out a query on the bus 235 and listen for a response from the SIM 230. In another example, the SIM 230 may trigger a signal to the electronic processor 205 when present in the device.

At block 408, the electronic processor 205, responsive to detecting that a subscriber identity module is installed in the converged communication device (at block 406), determines a network type for the subscriber identity module. For example, the electronic processor 205 may query the SIM 230 and receive the network type 280 in reply. In another example, the powerup sequence may include a step where the SIM 230 provides, among other things, the network type 280 to the electronic processor 205.

At block 410, the electronic processor 205 controls the first communication interface (for example, the communication interface 225) based on the network type and the last operation mode. For example, where the last operation mode was a secure mode and the network type is private, the electronic processor 205 may control the first communication interface to communicate wirelessly with a private communication network (for example, the first private network 110) using a first communication modality (for example, an LTE cellular protocol). Other examples of controlling the first communication interface based on the network type and the last operation mode are described below with respect to FIG. 3 and FIG. 4.

At block 412, the electronic processor 205, responsive to detecting that a subscriber identity module is not installed in the converged communication device (at block 406), controls the first communication interface (for example, the communication interface 225) to not communicate wirelessly. For example, the electronic processor 205 may issue a command to the communication interface 225 to enter an "airplane mode" (that is, to cease transmitting and receiving).

At block 414, as the converged communication device is booting (at block 402), the electronic processor 305, during the powerup sequence, determines the last operation mode for the first subsystem. As noted, upon bootup, the LMR subsystem 106 is not able to access the cellular subsystem 104 (and vice versa). Accordingly, the last operation mode is stored in the LMR subsystem 106. For example, the electronic processor 305 may retrieve the last operation mode information from a non-volatile memory of the LMR subsystem 106 (for example, the memory 310). In one example, the last operation mode stored in the memory 310 was received (as the then-current operation mode) from the cellular subsystem 104 during the prior operation cycle. In another example, as described herein, the last operation mode is selected by a user of the converged communication device 102 and stored in the memory 310. Because, as described herein, the last operation mode may be user selected, from the standpoint of the second subsystem 106, the last operation mode for the first subsystem 104 is the last known operation mode, and may not be the actual operation mode, in which the first subsystem 104 was last operating.

At block 416, the electronic processor 305 controls the second communication interface (for example, the communication interface 325) based on the last operation mode. For example, where the last operation mode was a secure mode, the electronic processor 305 may control the second communication interface to communicate wirelessly with a second private communication network (for example, the second private network 114) using a second communication modality (for example, a digital LMR protocol). Other examples of controlling the second communication interface based on the last operation mode are described below with respect to FIG. 3 and FIG. 4.

Figure 3:
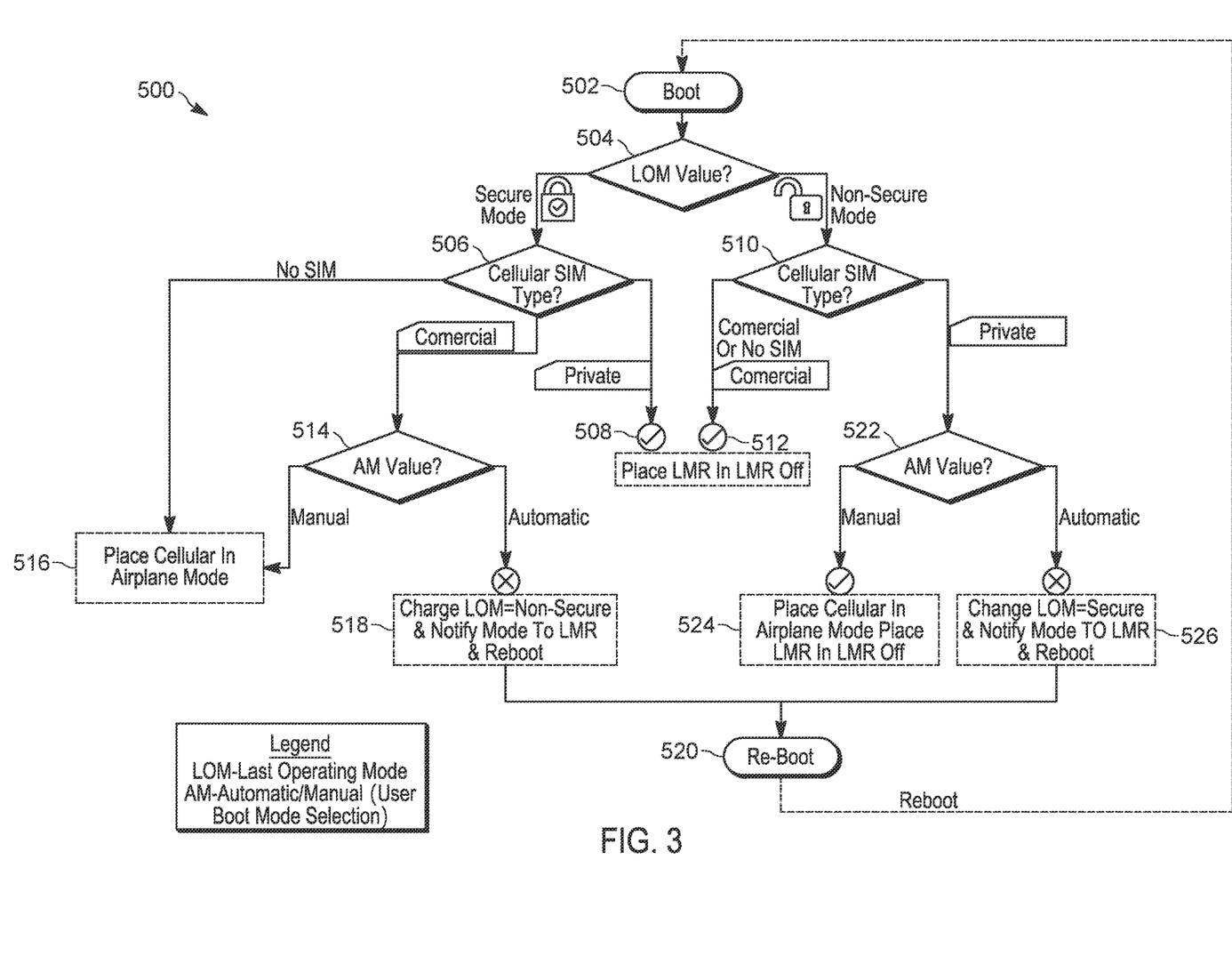
FIG. 3 is a block diagram of another method performed by the converged communication device of FIG. 1, according to some examples.

FIG. 3 illustrates another example method 500 for operating a converged communication device. The method 500 is described as being executed by the converged communication device 102 and, in particular, by the electronic processors 205 and 305. However, in some examples, aspects of the method 500 may be performed by other components of the converged communication device 102. For example, some or all of the method 500 may be performed by the electronic processors in conjunction with their respective bootloaders. As an example, the method 500 is described in terms of a first subsystem (the cellular subsystem 104) and a second subsystem (the LMR subsystem 106).

At block 502, the converged communication device 102 boots. The bootup may be the result of a powerup from powered off state or the result of a reboot initiated during a previous powered on state. The first and second subsystems perform their respective powerup sequences as a result of the converged communication device 102 booting.

At block 504, the converged communication device 102 determines the last operation mode for the cellular subsystem 104. As described above with respect to FIG. 2, in some instances, this determination is made by both electronic processors 205 and 305. In some instances, as described herein, the last operation mode is selected by a user of the converged communication device 102.

At block 506, when the last operation mode was a secure mode, the electronic processor 205 detects a SIM and, if detected, determines a network type (for example, public or private).

At block 508, responsive to determining that the last operation mode for the first subsystem was a secure mode and that the network type is private, the electronic processor 205 initiates a boot up sequence for a secure data partition of the first subsystem and controls the first communication interface to communicate wirelessly with a private communication network using the first communication modality. For example, the electronic processor 205 may load and execute the bootloader 270 to launch the operating system 275 using the secure partition 240 and, when the operating system 275 launch has progressed sufficiently, control the communication interface 225 to communicate wirelessly with the first private network 110 using an LTE cellular protocol. In addition, in one example, responsive to determining that the last operation mode for the first subsystem was the secure mode, the electronic processor 305 controls the second communication interface to communicate wirelessly with a second private communication network (for example, the second private network 114) using a second communication modality (for example, a digital LMR protocol), and initiates a secure inter-processor communication link with the first subsystem (as described with respect to FIG. 4).

At block 510, when the last operation mode was a secure mode, the electronic processor 205 detects a SIM and, if detected, determines a network type (for example, public or private).

At block 512, responsive to determining that the last operation mode for the first subsystem was a non-secure mode and that either the network type is commercial (that is, public) or that there is no SIM installed, the electronic processor 205 initiates a boot up sequence for a non-secure data partition of the first subsystem and controls the first communication interface to communicate wirelessly with a public communication network using the first communication modality. For example, the electronic processor 205 may load and execute the bootloader 270 to launch the operating system 275 using the non-secure partition 245 and, when the operating system 275 launch has progressed sufficiently, control the communication interface 225 to communicate wirelessly with the public network 112 using an LTE cellular protocol. In addition, in one example, responsive to determining that the last operation mode for the first subsystem was the non-secure mode, the electronic processor 305 controls the second communication interface to not communicate wirelessly and initiates a secure inter-processor communication link with the first subsystem (as described with respect to FIG. 4).

In some examples, the electronic processor 205 is configured to retrieve a user boot mode selection and control the communication interface 225 based on the network type, the last operation mode, and the user boot mode selection. The user boot mode determines whether a user of the converged communication device 102 can select the operation mode for the device. In one example, the user boot mode may be set to manual (that is, the user is allowed to switch operation modes) or automatic (that is, the operation mode is set based on the type of SIM inserted into the device). In some instances, the user boot mode also determines how a power menu for the converged communication device is presented. For example, when the user boot mode is manual, a power menu may display the current operation mode (that is, secure or non-secure) and graphical user interface control elements that allow the user to select between restarting in the current operation mode or switching from the current operation mode to another available operation mode and restarting the device. In another example, when the user boot mode is automatic, a power menu may display the current operation mode (that is, secure or non-secure) and a graphical user interface control element that allows the user to restart in the current operation mode.

Returning to FIG. 3, responsive to determining that the last operation mode for the first subsystem was a secure mode (at block 504), determining that the user boot mode selection is manual (at 514), and determining that either the network type is commercial (that is, public) or that there is no SIM installed (at block 506), the electronic processor 205 (at block 516) initiates a boot up sequence for a secure data partition of the first subsystem, and controls the first communication interface to not communicate wirelessly.

At block 518, responsive to determining that the last operation mode for the first subsystem was a secure mode (at block 504), determining that the user boot mode selection is automatic (at 514) and determining that the network type is commercial (that is, public), the electronic processor 205 sets the last operation mode for the first subsystem to indicate a non-secure mode (for example, by writing a value to the memory 210), provides a mode notification indicating the non-secure mode to the second subsystem via an inter-processor communication link (for example, as described with respect to FIG. 4), and initiates a reboot sequence for the first subsystem (at block 520). In one example, the electronic processor 205 provides the mode notification using a suitable electronic messaging protocol. In another example, the inter-processor communication link is a connection between general-purpose input/outputs (GPIOs) of the electronic processor 205 and the electronic processor 305 and the electronic processor 205 provides the mode notification by application of logic levels, which are predetermined to indicate particular operation modes. Upon receipt of such notification, the electronic processor 305 writes the operation mode to a non-volatile memory. In some examples, a reboot is not initiated and ordinary device operations resume.

In alternative examples, responsive to determining that the last operation mode for the first subsystem was a secure mode (at block 504), determining that the user boot mode selection is automatic (at 514) and that there is no SIM installed (at block 506), the electronic processor 205 sets the last operation mode for the first subsystem to indicate a non-secure mode (for example, by writing a value to the memory 210), provides a mode notification indicating the non-secure mode to the second subsystem via an inter-processor communication link (for example, as described with respect to FIG. 4), and initiates a reboot sequence for the first subsystem (at block 520).

At block 524, responsive to determining that that the last operation mode for the first subsystem was a non-secure mode (at block 504), determining that the user boot mode selection is manual (at block 522), and determining that the network type is private (at block 510), the electronic processor 205 initiates a boot up sequence for a non-secure data partition of the first subsystem, and controls the first communication interface to not communicate wirelessly. The electronic processor 305, responsive to determining that the last operation mode for the first subsystem was a non-secure mode (at block 504), controls the second communication interface to not communicate wirelessly.

At block 526, responsive to determining that that the last operation mode for the first subsystem was a non-secure mode (at block 504), determining that the user boot mode selection is automatic (at block 522), and determining that the network type is private (at block 510), the electronic processor 205 sets the last operation mode for the first subsystem to indicate a secure mode (for example, by writing a value to the memory 210), provides a mode notification indicating the secure mode to the second subsystem via an inter-processor communication link (for example, as described with respect to FIG. 4), and initiates a reboot sequence for the first subsystem (at block 520). In some examples, a reboot is not initiated and ordinary device operations resume.

Figure 4:
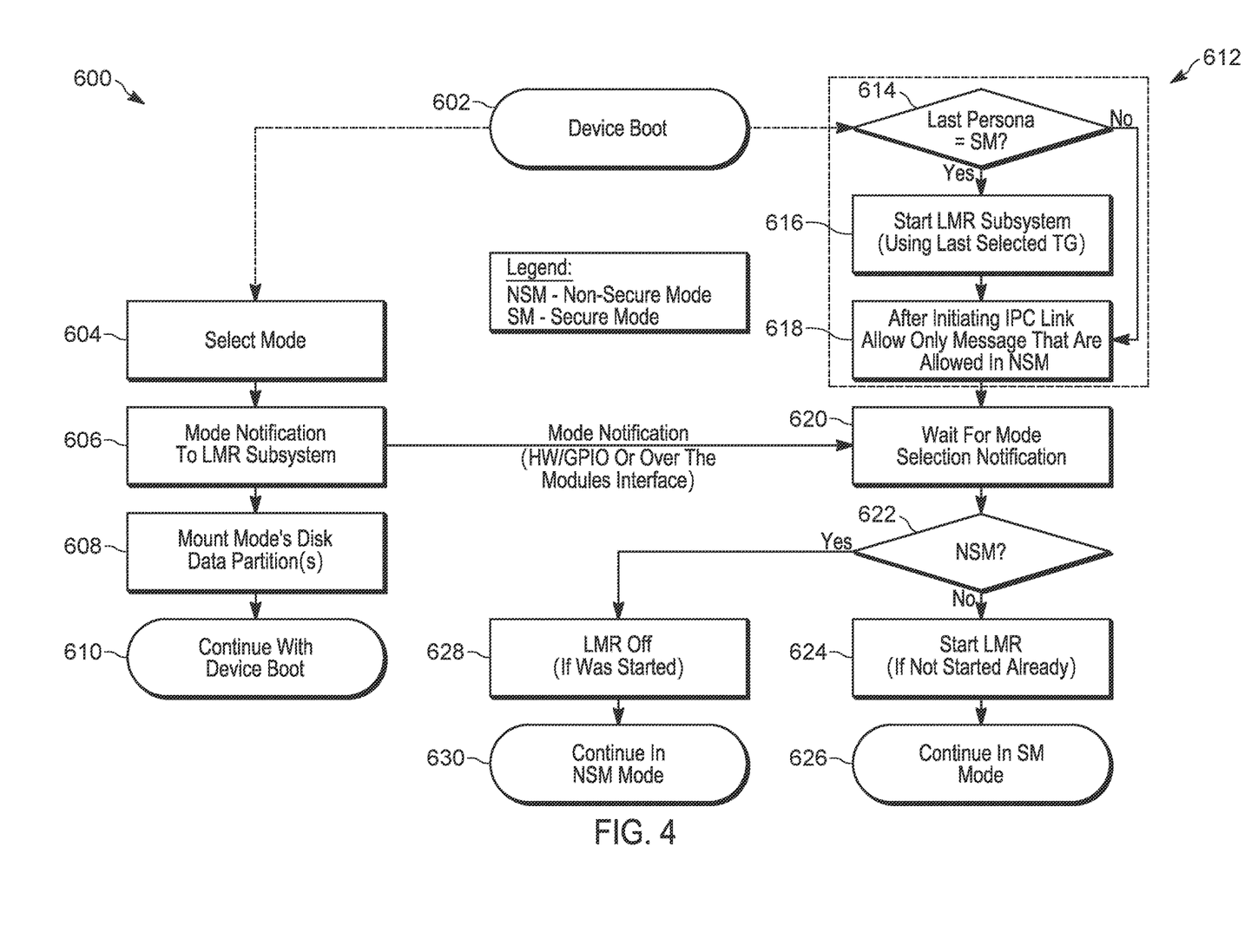
FIG. 4 is a block diagram of another method performed by the converged communication device of FIG. 1, according to some examples.

FIG. 4 illustrates another example method 600 for operating a converged communication device. The method 600 is described as being executed by the converged communication device 102 and, in particular, by the electronic processors 205 and 305. However, in some examples, aspects of the method 600 may be performed by other components of the converged communication device 102. For example, some or all of the method 600 may be performed by the electronic processors in conjunction with their respective bootloaders. As an example, the method 600 is described in terms of a first subsystem (the cellular subsystem 104) and a second subsystem (the LMR subsystem 106).

At block 602, the converged communication device 102 boots. The bootup may be the result of a powerup from powered off state or the result of a reboot initiated during a previous powered on state (for example, as described with respect to FIG. 3). The first and second subsystems perform their respective startup sequences as a result of the converged communication device 102 booting.

At block 604, the electronic processor 205 selects an operational mode for the cellular (first) subsystem 104. In one example, the selection is performed according to the method 500, as described herein (that is, automatically or manually).

At block 606, the electronic processor 205 provides a mode notification indicating the selected mode to the LMR (second) subsystem via an inter-processor communication link, as described herein.

At block 608, the electronic processor 205 mounts either the secure partition 240 or the non-secure partition 245 based on the mode selection (at block 604) and continues with device boot (at block 610).

As noted, the LMR subsystem 106 typically boots faster than the cellular subsystem 104. In such instances, the LMR subsystem 106 will powerup according to the sequence 612, based on the last operation mode, and, if necessary, alter its operation based on the mode notification from the cellular subsystem 104, as described below.

At block 614, the electronic processor 305 determines the last operation mode, as described herein.

At block 616, responsive to determining that the last operation mode for the first subsystem was the secure mode, the electronic processor 305 controls the second communication interface to communicate wirelessly with a second private communication network (for example, the second private network 114) using a second communication modality (for example, an LMR protocol). In some instances, the electronic processor 305 retrieves from the firmware 320 a talkgroup identifier and controls the second communication interface to join the identified talkgroup upon joining the LMR network.

As described herein, it is possible, in some instances, for the cellular subsystem to boot into a non-secure operation mode after having operated in a secure operation mode. Because the LMR subsystem 106 typically boots faster than the cellular subsystem 104, it will allow secure LMR communications based on the knowledge of the last operation mode. However, to prevent a non-secure operation of the cellular subsystem 104 from accessing the LMR systems, the electronic processor, at block 618, initiates a secure inter-processor communication link with the first subsystem. Such a communication link only allows the electronic processor 305 to receive mode notification messages and prevents access to other aspects of the LMR subsystem 106 by the cellular subsystem 104. As illustrated in FIG. 4, when the last operation mode is a non-secure mode, the electronic processor 305 does not enable the communication interface 325, but instead initiates a secure inter-processor communication link with the first subsystem.

At block 620, the electronic processor 305 waits to receive the mode selection notification from the cellular subsystem 104.

At block 624, responsive receiving the secure mode notification via the inter-processor communication link with the first subsystem (at block 622), controls the second communication interface to communicate wirelessly with a second private communication network using the second communication modality, enabling it in the case where it had yet to be started (at block 616) and continues to operate in the secure mode (with LMR communications active) at block 626.

At block 628, responsive to receiving the non-secure mode notification via the inter-processor communication link with the first subsystem (at block 622), the electronic processor 305 controls the second communication interface to not communicate wirelessly, disabling it in the case where it was already started (at block 616) and continues to operate in the non-secure mode (with LMR communications turned off) at block 630.

In the description above, the terms "cellular" and "land mobile radio" or "LMR" are used to distinguish between components included in a converged communication device that implement different communication modalities, for example, the long term evolution (LTE) cellular protocol and the Terrestrial Trunked Radio (TETRA) land mobile radio protocol. In addition, the terms "first" and "second" are used, in some instances, in place of the terms "cellular" and "LMR." These terms, however, are not meant to imply that any of the components so labeled are superior or inferior to other components or arranged in a particular order. Nonetheless, in some of the foregoing examples, the "second" LMR subsystem 106 is subordinate to the "first" cellular subsystem 104 in the sense that the cellular subsystem 104 may include software and hardware for controlling certain aspects of the LMR subsystem 106 or of the converged communication device 102, upon which the LMR subsystem 106 depends.

The systems and methods described herein, although described in terms of a converged communication device, are not limited in their applicability to a converged communication device. In view of the description above, a person of ordinary skill in the art could implement the examples described in many different types of electronic devices that include multiple subsystems where one subsystem is capable of booting multiple partition types and another subsystem is not. For example, a device capable of dual communications, including an LMR subsystem and a broadband (though not necessarily cellular) capable subsystem could operate using the methods described herein.

In the foregoing specification, specific examples have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

We claim:

1. A converged communication device, comprising:
a first subsystem including a first electronic processor and a first communication interface configured to communicate wirelessly using a first communication modality, wherein the first electronic processor is coupled to the first communication interface and configured, during a startup sequence of the first subsystem, to:
determine a last operation mode for the first subsystem;
detect whether a subscriber identity module is installed in the converged communication device;
responsive to detecting that a subscriber identity module is installed in the converged communication device:
determine a network type for the subscriber identity module, and
control the first communication interface based on the network type and the last operation mode; and
responsive to detecting that a subscriber identity module is not installed in the converged communication device, control the first communication interface to not communicate wirelessly;
and
a second subsystem including a second electronic processor and a second communication interface configured to communicate wirelessly using a second communication modality, wherein the second electronic processor is coupled to the second communication interface and configured, during the startup sequence of the second subsystem, to:
determine the last operation mode for the first subsystem; and
control the second communication interface based on the last operation mode.

2. The converged device of claim 1, wherein:
the first electronic processor is further configured, responsive to determining that the last operation mode for the first subsystem was a secure mode and that the network type is private, to
initiate a boot up sequence for a secure data partition of the first subsystem, and
control the first communication interface to communicate wirelessly with a private communication network using the first communication modality; and
the second electronic processor is further configured to, responsive to determining that the last operation mode for the first subsystem was the secure mode,
control the second communication interface to communicate wirelessly with a second private communication network using the second communication modality, and
initiate a secure inter-processor communication link with the first subsystem.

3. The converged device of claim 1, wherein:
the first electronic processor is further configured, responsive to determining that the last operation mode for the first subsystem was a non-secure mode, and to one selected from the group consisting of detecting that the subscriber identity module is not installed and determining that the network type is public, to
initiate a boot up sequence for a non-secure data partition of the first subsystem, and
control the first communication interface to communicate wirelessly with a public communication network using the first communication modality; and
the second electronic processor is further configured, responsive to determining that the last operation mode for the first subsystem was the non-secure mode, to
control the second communication interface to not communicate wirelessly, and
initiate a secure inter-processor communication link with the first subsystem.

4. The converged device of claim 1, wherein the first subsystem further includes a first memory coupled to the first electronic processor, and the first electronic processor is further configured to:
retrieve, from the first memory, a user boot mode selection; and control the first communication interface based on the network type, the last operation mode, and the user boot mode selection.

5. The converged device of claim 4, wherein:
the first electronic processor is further configured, responsive to:
determining that the last operation mode for the first subsystem was a secure mode,
determining that the user boot mode selection is manual, and
to one selected from the group consisting of detecting that the subscriber identity module is not installed and determining that the network type is public, to
initiate a boot up sequence for a secure data partition of the first subsystem, and
control the first communication interface to not communicate wirelessly; and
the second electronic processor is further configured, responsive to determining that the last operation mode for the first subsystem was the secure mode, to control the second communication interface to communicate wirelessly with a second private communication network using the second communication modality.

6. The converged device of claim 4, wherein:
the first electronic processor is further configured, responsive to:
determining that the last operation mode for the first subsystem was a secure mode,
determining that the user boot mode selection is automatic, and
to one selected from the group consisting of detecting that the subscriber identity module is not installed and determining that the network type is public, to:
set the last operation mode for the first subsystem to indicate a non-secure mode,
provide a mode notification indicating the non-secure mode to the second subsystem via an inter-processor communication link, and
initiate a reboot sequence for the first subsystem.

7. The converged device of claim 6, wherein the second electronic processor is further configured:
responsive to determining that the last operation mode for the first subsystem was the secure mode, to control the second communication interface to communicate wirelessly with a second private communication network using the second communication modality; and
responsive to receiving the mode notification via the inter-processor communication link with the first subsystem, to control the second communication interface to not communicate wirelessly.

8. The converged device of claim 4, wherein:
the first electronic processor is further configured, responsive to:
determining that the last operation mode for the first subsystem was a non-secure mode,
determining that the user boot mode selection is manual, and
determining that the network type is private, to:
initiate a boot up sequence for a non-secure data partition of the first subsystem, and
control the first communication interface to not communicate wirelessly; and
the second electronic processor is further configured, responsive to determining that the last operation mode for the first subsystem was the non-secure mode, to:
control the second communication interface to not communicate wirelessly, and
initiate a secure inter-processor communication link with the first subsystem.

9. The converged device of claim 4, wherein:
the first electronic processor is further configured, responsive to:
determining that the last operation mode for the first subsystem was a non-secure mode,
determining that the user boot mode selection is automatic, and
determining that the network type is private, to:
set the last operation mode for the first subsystem to indicate a secure mode,
provide a mode notification to the second subsystem via an inter-processor communication link, and
initiate a reboot sequence for the first subsystem.

10. The converged device of claim 9, wherein the second electronic processor is further configured:
responsive to determining that the last operation mode for the first subsystem was the non-secure mode, to control the second communication interface to not communicate wirelessly; and
responsive to receiving the mode notification via the inter-processor communication link with the first subsystem, to control the second communication interface to communicate wirelessly with a second private communication network using the second communication modality.

11. The converged communication device of claim 4, further comprising:
a human machine interface communicatively coupled to the first electronic processor;
wherein the first electronic processor is further configured to:
receive, via the human machine interface, a first user input selecting the user boot mode selection, wherein the first user input is one selected from the group consisting of automatic and manual;
write, to the first memory, the user boot mode selection based on the first user input;
responsive to the user boot mode selection being automatic, display, on the human machine interface, a power menu, wherein the power menu includes a graphical indication of a current operation mode for the converged communication device and a restart control element; and
responsive to the user boot mode selection being manual, display, on the human machine interface, the power menu, wherein the power menu includes a graphical indication of the current operation mode for the converged communication device, a restart control element, and a switch mode control element.

12. The converged communication device of claim 11, wherein the first electronic processor is further configured, responsive to receiving, via the human machine interface, a second user input indicating the restart control element, to: set the last operation mode to the current operation mode, and initiate a reboot sequence for the converged communication device.

13. The converged communication device of claim 11, wherein the first electronic processor is further configured, responsive to receiving, via the human machine interface, a second user input indicating the switch mode control element, to alter the last operation mode based on the current operation mode and initiate a reboot sequence for the converged communication device.

14. A method for operating a converged communication device including a first subsystem and a second subsystem, the method comprising:
- determining, during a startup sequence of the first subsystem and with a first electronic processor of the first subsystem, a last operation mode for the first subsystem;
- detecting whether a subscriber identity module is installed in the converged communication device;
- determining, responsive to detecting that a subscriber identity module is installed in the converged communication device, a network type for the subscriber identity module;
- controlling, with the first electronic processor, a first communication interface based on the network type and the last operation mode;
- determining, during a startup sequence of the second subsystem and with a second electronic processor of the second subsystem, the last operation mode for the first subsystem; and
- controlling, with the second electronic processor, a second communication interface based on the last operation mode.

15. The method of claim 14, further comprising:
- responsive to determining that the last operation mode for the first subsystem was a secure mode and that the network type is private:
  - initiating, with the first electronic processor, a boot up sequence for a secure data partition of the first subsystem, and
  - controlling, with the first electronic processor, the first communication interface to communicate wirelessly with a private communication network using a first communication modality; and
- responsive to determining that the last operation mode for the first subsystem was the secure mode:
  - controlling, with the second electronic processor, the second communication interface to communicate wirelessly with a second private communication network using a second communication modality, and
  - initiating, with the second electronic processor, a secure inter-processor communication link with the first subsystem.

16. The method of claim 14, further comprising:
- responsive to: determining that the last operation mode for the first subsystem was a non-secure mode, and to one selected from the group consisting of detecting that the subscriber identity module is not installed and determining that the network type is public; initiating, with the first electronic processor, a boot up sequence for a non-secure data partition of the first subsystem, and controlling, with the first electronic processor, the first communication interface to communicate wirelessly with a public communication network using a first communication modality; and
- responsive to determining that the last operation mode for the first subsystem was the non-secure mode: controlling, with the second electronic processor, the second communication interface to not communicate wirelessly, and initiating, with the second electronic processor, a secure inter-processor communication link with the first subsystem.

17. The method of claim 14, further comprising:
- retrieving, from a first memory of the first subsystem, a user boot mode selection; and
- controlling, with the first electronic processor, the first communication interface based on the network type, the last operation mode, and the user boot mode selection.

18. The method of claim 17, further comprising:
- responsive to: determining that the last operation mode for the first subsystem was a secure mode, determining that the user boot mode selection is manual, and to one selected from the group consisting of detecting that the subscriber identity module is not installed and determining that the network type is public, initiating, with the first electronic processor, a boot up sequence for a secure data partition of the first subsystem, and controlling, with the first electronic processor, the first communication interface to not communicate wirelessly; and
- controlling, with the second electronic processor, the second communication interface to communicate wirelessly with a second private communication network using a second communication modality responsive to determining that the last operation mode for the first subsystem was the secure mode.

19. The method of claim 17, further comprising:
- responsive to: determining that the last operation mode for the first subsystem was a secure mode, determining that the user boot mode selection is automatic, and to one selected from the group consisting of detecting that the subscriber identity module is not installed and determining that the network type is public;
- setting, with the first electronic processor, the last operation mode for the first subsystem to indicate a non-secure mode;
- providing, with the first electronic processor, a mode notification indicating the non-secure mode to the second subsystem via an inter-processor communication link; and
- initiating, with the first electronic processor, a reboot sequence for the first subsystem.

20. The method of claim 19, further comprising:
- responsive to determining that the last operation mode for the first subsystem was the secure mode, controlling, with the second electronic processor, the second communication interface to communicate wirelessly with a second private communication network using a second communication modality; and
- responsive to receiving the mode notification via the inter-processor communication link with the first subsystem, controlling, with the second electronic processor, the second communication interface to not communicate wirelessly.

21. The method of claim 17, further comprising:
- responsive to determining that the last operation mode for the first subsystem was a non-secure mode, determining that the user boot mode selection is manual, and determining that the network type is private: initiating, with the first electronic processor, a boot up sequence for a non-secure data partition of the first subsystem, and controlling, with the first electronic processor, the first communication interface to not communicate wirelessly; and
- responsive to determining that the last operation mode for the first subsystem was the non-secure mode: controlling, with the second electronic processor, the second communication interface to not communicate wirelessly, and initiating, with the second electronic processor, a secure inter-processor communication link with the first subsystem.

22. The method of claim 17, further comprising:
responsive to determining that the last operation mode for the first subsystem was a non-secure mode, determining that the user boot mode selection is automatic, and determining that the network type is private:
setting, with the first electronic processor, the last operation mode for the first subsystem to indicate a secure mode,
providing, with the first electronic processor, a mode notification to the second subsystem via an inter-processor communication link, and
initiating, with the first electronic processor, a reboot sequence for the first subsystem.

23. The method of claim 22, further comprising:
responsive to determining that the last operation mode for the first subsystem was the non-secure mode, controlling, with the second electronic processor, the second communication interface to not communicate wirelessly; and
responsive to receiving the mode notification via the inter-processor communication link with the first subsystem, controlling, with the second electronic processor, the second communication interface to communicate wirelessly with a second private communication network using a second communication modality.

* * * * *